United States Patent
Wangemann et al.

(10) Patent No.: US 10,027,113 B2
(45) Date of Patent: Jul. 17, 2018

(54) HIGH-VOLTAGE DC VOLTAGE UNIT AND METHOD FOR OPERATING A HIGH-VOLTAGE DC VOLTAGE UNIT

(71) Applicants: AIRBUS OPERATIONS GMBH, Hamburg (DE); EADS DEUTSCHLAND GMBH, Ottobrunn (DE)

(72) Inventors: Joerg Wangemann, Magdeburg (DE); Jens Schult, Stelle (DE)

(73) Assignees: Airbus Operations GmbH, Hamburg (DE); Airbus Defence and Space GmbH, Taufkirchen (DE)

( * ) Notice: Subject to any disclaimer, the term of this patent is extended or adjusted under 35 U.S.C. 154(b) by 264 days.

(21) Appl. No.: 14/283,546

(22) Filed: May 21, 2014

(65) Prior Publication Data

US 2014/0346897 A1 Nov. 27, 2014

(30) Foreign Application Priority Data

May 23, 2013 (DE) .......... 10 2013 209 544

(51) Int. Cl.
*G05F 3/06* (2006.01)
*H02J 1/10* (2006.01)
(Continued)

(52) U.S. Cl.
CPC ............ *H02J 1/10* (2013.01); *H02J 1/08* (2013.01); *H02J 5/00* (2013.01); *H02M 7/10* (2013.01);
(Continued)

(58) Field of Classification Search
CPC .... H02J 1/08; H02J 5/00; H02M 7/10; H02M 7/25; H02M 2001/0077; H02M 7/487; H02P 2101/30
(Continued)

(56) References Cited

U.S. PATENT DOCUMENTS 6,930,899 B2   8/2005   Bakran et al.
7,324,359 B2   1/2008   Schreiber
(Continued)

FOREIGN PATENT DOCUMENTS

| DE | 101 31 961 | 1/2003 |
|---|---|---|
| DE | 10 2004 001 478 | 8/2005 |
| WO | WO 99/43067 | 8/1999 |
| WO | WO 2011/055175 | 5/2011 |
| WO | WO 2011/098117 | 8/2011 |

OTHER PUBLICATIONS

German Search Report for Application Serial No. 10 2013 209 544.9 dated Jan. 21, 2014.

*Primary Examiner* — Rexford Barnie
*Assistant Examiner* — Toan Vu
(74) *Attorney, Agent, or Firm* — Jenkins, Wilson, Taylor & Hunt, P.A.

(57) ABSTRACT

A high-voltage DC voltage unit with a first DC voltage apparatus providing a first high-voltage DC voltage between a first output connection and a second output connection of the DC voltage apparatus or can be fed with a first high-voltage DC voltage. A second DC voltage apparatus provides a second high-voltage DC voltage or can be fed with a second high-voltage DC voltage. A first DC voltage connection is coupled with the first output connection of the first DC voltage apparatus. A second DC voltage connection is coupled with the second output connection of the second DC voltage apparatus. A reference potential connection is coupled with the second output connection of the first DC voltage apparatus, with the first output connection of the second DC voltage apparatus and with an earth potential, the first and second high-voltage DC voltages realizing a bipolar power supply.

10 Claims, 3 Drawing Sheets

(51) Int. Cl.
*H02J 5/00* (2016.01)
*H02J 1/08* (2006.01)
*H02M 7/10* (2006.01)
*H02M 7/25* (2006.01)
*H02M 1/00* (2006.01)
*H02M 7/487* (2007.01)
*H02P 101/30* (2015.01)

(52) U.S. Cl.
CPC .............. *H02M 7/25* (2013.01); *H02M 7/487* (2013.01); *H02M 2001/0077* (2013.01); *H02P 2101/30* (2015.01)

(58) Field of Classification Search
USPC ......................................................... 307/151
See application file for complete search history.

(56) References Cited

U.S. PATENT DOCUMENTS

| | | | |
|---|---|---|---|
| 7,638,890 B2 | 12/2009 | Lando et al. | |
| 2008/0298103 A1* | 12/2008 | Bendre | H02M 7/487 363/89 |
| 2010/0309698 A1* | 12/2010 | Asplund | H02J 3/36 363/126 |
| 2012/0025604 A1 | 2/2012 | Baumann et al. | |
| 2012/0069610 A1 | 3/2012 | Trainer et al. | |
| 2013/0285615 A1* | 10/2013 | Vieillard | H02J 7/0068 320/128 |
| 2015/0145252 A1* | 5/2015 | Lin | F03D 9/005 290/44 |

* cited by examiner

HIGH-VOLTAGE DC VOLTAGE UNIT AND METHOD FOR OPERATING A HIGH-VOLTAGE DC VOLTAGE UNIT

CROSS-REFERENCE TO RELATED APPLICATION

This application claims benefit of and priority to German patent application No. 10 2013 209 544.9, filed May 23, 2013, the entire disclosure of which is herein incorporated by reference.

TECHNICAL FIELD

The present invention relates to a high-voltage DC voltage unit and to a method for operating a high-voltage DC voltage unit, in particular to a bipolar high-voltage DC voltage unit for the power supply in an aircraft.

BACKGROUND

Bipolar high-voltage voltages, for example ±270 V bipolar DC voltage, are often required in aircraft. Generators and appropriate rectifiers are usually used to provide voltages of this type. U.S. Pat. No. 7,638,890 B2 discloses for example a high-voltage generator with a five-phase rectifier which provides a bipolar high-voltage DC voltage with mains-free power supply. US 2012/0025604 A1 discloses an electrical energy supply system for an aircraft with a three-phase generator which feeds technical loads and has an insulation monitor for monitoring high reference potential-to-earth impedances. WO 2011/098117 A1 discloses a voltage converter which uses a rectifier to provide a bipolar high-voltage DC voltage from a three-phase alternating voltage, and in which the reference potential is tapped at a neutral point of a neutral point wiring of three phase chokes.

In this respect, on the one hand undesirable fluctuations can be produced in the common-mode output voltage. Nowadays, fluctuations of this type are compensated by filter stages appropriately connected downstream of the rectifier.

On the other hand, measures have to be taken against the failure of the entire supply of DC voltage if one of the potential connections fails. This can be ensured, for example, by protective circuits between the connection poles and the reference potential.

However, there is a need for a bipolar high-voltage DC voltage unit, in which fluctuations in the common-mode output voltage can be reduced and the resilience against failure of one of the DC voltage potential connections is improved.

SUMMARY

Therefore, according to a first aspect of the disclosure, a high-voltage DC voltage unit is provided, comprising a first DC voltage apparatus which is configured to provide a first high-voltage DC voltage between a first output connection and a second output connection of the first DC voltage apparatus or is configured to be fed with a first high-voltage DC voltage, a second DC voltage apparatus which is configured to provide a second high-voltage DC voltage between a first output connection and a second output connection of the second DC voltage apparatus or is configured to be fed with a second high-voltage DC voltage, a first DC voltage connection which is coupled with the first output connection of the first DC voltage apparatus, a second DC voltage connection which is coupled with the second output connection of the second DC voltage apparatus, and a reference potential connection which is coupled with the second output connection of the first DC voltage apparatus, with the first output connection of the second DC voltage apparatus and with an earth potential, the first and second high-voltage DC voltages realising a bipolar power supply.

Furthermore, according to a second aspect of the disclosure, an aircraft having one or more high-voltage DC voltage units of the invention according to the first aspect is provided.

According to a third aspect, the disclosure further provides a method for operating a high-voltage DC voltage unit according to the invention, comprising the steps of generating a first high-voltage DC voltage by a first DC voltage apparatus between a first output connection and a second output connection of the first DC voltage apparatus, generating a second high-voltage DC voltage by a second DC voltage apparatus between a first output connection and a second output connection of the second DC voltage apparatus, and providing a bipolar power supply by providing the first high-voltage DC voltage between a first DC voltage connection which is coupled with the first output connection of the first DC voltage apparatus, and a reference potential connection which is coupled with the second output connection of the first DC voltage apparatus, with the first output connection of the second DC voltage apparatus and with an earth potential, and by providing the second high-voltage DC voltage between a second DC voltage connection which is coupled with the second output connection of the second DC voltage apparatus, and the reference potential connection.

According to an embodiment of the high-voltage DC voltage unit of the disclosure, the DC voltage apparatuses can have in each case uncontrolled rectifiers. According to an alternative embodiment of the high-voltage DC voltage unit of the disclosure, the DC voltage apparatuses can have in each case four-quadrant actuators.

According to a further embodiment of the high-voltage DC voltage unit of the disclosure, the high-voltage DC voltage unit further comprises two alternating voltage generators which are coupled respectively with one of the DC voltage apparatus and are configured to feed the respectively coupled DC voltage apparatus with electric alternating voltage. In this respect, according to an embodiment of the high-voltage DC voltage unit according to the disclosure, the two alternating voltage generators can be configured within a single electrical machine with two sets of windings.

According to a further embodiment of the high-voltage DC voltage unit of the disclosure, the DC voltage apparatuses can be bridge halves of a multi-level (A) NPC power converter.

In this respect, according to a further embodiment of the high-voltage DC voltage unit of the disclosure, the high-voltage DC voltage unit can further comprise an electrical machine which is coupled with the multi-level (A)NPC power converter and which is configured to feed both bridge halves of said multi-level (A)NPC power converter with electric alternating voltage.

According to a further embodiment of the high-voltage DC voltage unit of the disclosure, the high-voltage DC voltage unit further comprises a first DC voltage intermediate circuit which is coupled between the DC voltage output connections.

According to a further embodiment of the high-voltage DC voltage unit of the disclosure, the high-voltage DC voltage unit further comprises two second DC voltage intermediate circuits which are respectively coupled between the first and second output connections of the first and second DC voltage apparatuses.

BRIEF DESCRIPTION OF THE DRAWINGS

In the following, the subject matter disclosed herein will be described more precisely in connection with and with reference to the exemplary embodiments as in the accompanying drawings.

The accompanying drawings serve to provide a clearer understanding of the present invention and they illustrate exemplary variants of embodiments of the invention. They are used to explain principles, advantages, technical effects and possible variations. Of course, other embodiments and many of the intended advantages of the invention are also possible, particularly in view of the detailed description of the invention provided below. The elements in the drawings are not necessarily shown true to scale and have partly been shown in a simplified or diagrammatic manner for reasons of clarity. The same reference numerals denote the same or similar components or elements.

DETAILED DESCRIPTION

Although specific embodiments are described and illustrated here, it is clear to a person skilled in the art that a plethora of further, alternative and/or equivalent implementations can be chosen for the embodiments, without essentially departing from the basic concept of the present invention. In general, all variations, modifications and alterations of the embodiments described here are to be considered as also covered by the invention.

Electrical machines in the context of the present disclosure denote all devices with energy converter functionality which can convert mechanical energy into electrical energy and vice versa. Electrical machines in the context of the present disclosure are used in generator operation to generate a power supply which can feed DC voltage devices which thereby realise a bipolar power supply. Alternatively, the electrical machines in the context of the present disclosure can also be used in motor operation, which machines take up an externally provided bipolar power supply. Electrical machines in the context of the present disclosure can include, for example, induction machines such as synchronous or asynchronous machines, reluctance machines, split-pole machines, direct current machines, repulsion machines or other types of machine.

Figure 1:
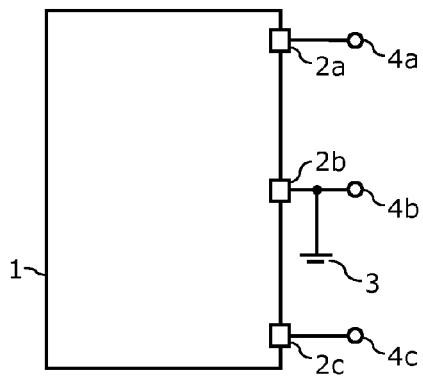
FIG. 1 shows a schematic illustration of a high-voltage DC voltage unit according to an embodiment of the invention.

FIG. 1 shows a schematic illustration of a high-voltage DC voltage unit 1. The high-voltage DC voltage unit 1 comprises two DC voltage output connections 2a and 2c which are each coupled with tapping terminals 4a and 4c. The high-voltage DC voltage unit 1 also comprises a reference potential connection 2b which is coupled with an earth potential 3 and can be tapped at a reference potential terminal 4b. When the high-voltage DC voltage unit 1 is used in an aircraft, a high-voltage DC voltage, for example ±270 V, which is bipolar with respect to the reference potential connection 2b can be tapped at these tapping terminals 4a and 4c.

While the voltage between the tapping terminals 4a and 4c is usually stable and low in fluctuations, significant fluctuations in the common-mode voltage ("common-mode voltage ripples") can occur when drawing the reference potential from the neutral point of the machine (not contained in the figures), if a unipolar voltage is tapped between one of the tapping terminals 4a and 4c and the reference potential terminal 4b. This problem can occur, for example, in a neutral point wiring of an electrical machine, as described in US 2012/0025604 A1.

Furthermore, conditional connections have to be provided between the individual tapping terminals 4a and 4c and the reference potential terminal 4b to afford a safeguard against failure in the case of high impedances of one of the DC voltage connections 2a and 2c or in the case of short circuits between earth and the DC voltage connections 2a and 2c, particularly when fluctuation-tolerant loads are operated on the high-voltage DC voltage unit 1. Conditional connections of this type can be implemented, for example, by diodes or specifically activatable relays, switches or similar switching elements between the tapping terminals 4a and 4c and the reference potential terminal 4b. In this respect, it should be noted that high-voltage DC voltage units with connections of this type cannot be primarily used to supply a high-voltage DC voltage network, since a low-resistance earth connection may not exist here.

Figure 2:
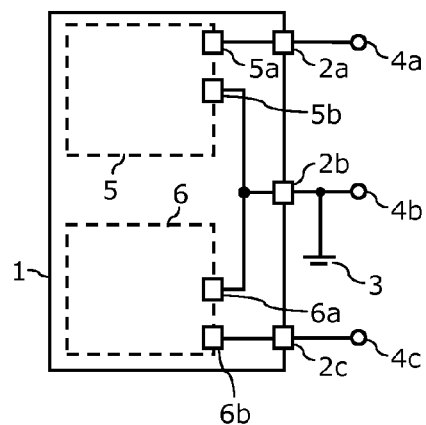
FIG. 2 shows a schematic illustration of a high-voltage DC voltage unit according to a further embodiment of the invention.

Therefore, FIG. 2 shows a schematic illustration of a high-voltage DC voltage unit 1 which has separately controlled DC voltage apparatuses 5 and 6. In this respect, the DC voltage apparatuses 5 and 6 can comprise pure DC voltage sources, such as fuel cells, pure DC voltage loads, such as technical loads of an aircraft or bidirectionally operable DC voltage devices, such as motors/generators, electrically rechargeable energy storage devices, such as batteries or supercaps.

The first DC voltage apparatus 5 can be configured to provide a first high-voltage DC voltage between a first output connection 5a and a second output connection 5b. Analogously, the second DC voltage apparatus 6 can be configured to provide a second high-voltage DC voltage between a first output connection 6a and a second output connection 6b. This can be the case particularly for DC voltage sources or for bidirectionally operable DC voltage devices as DC voltage apparatuses 5 and 6.

In the case of pure DC voltage loads or bidirectionally operable DC voltage devices, the first DC voltage apparatus 5 can be configured to be fed with a first high-voltage DC voltage between the first output connection 5a and the second output connection 5b, and the second DC voltage apparatus 6 can be configured to be fed with a second high-voltage DC voltage between the first output connection 6a and the second output connection 6b.

The DC voltage connections 2a and 2c of the high-voltage DC voltage unit 1 are then respectively coupled with the first output connection 5a and with the second output connection 6b. However, the reference potential connection 2b is fed from the second output connection 5b and from the first output connection 6a. The reference potential connection 2b is also coupled with the earth potential 3, so that the first and second high-voltage DC voltages realise a bipolar power supply in respect of the earth potential 3.

Due to the configuration in FIG. 2, an implicit redundancy of the high-voltage DC voltage unit 1 is ensured in respect of high impedances ("open circuit state") at one of the DC voltage connections 2a and 2c or in respect of short circuits between earth and one of the DC voltage connections 2a and 2c. This advantageously allows the high-voltage DC voltage unit 1 to operate in a restricted operating mode ("degraded operation"), so that only limited additional safety measures would have to be taken. In particular, measures in the backend of the high-voltage DC voltage unit 1 can be avoided, for example conditional switching elements or diodes, with a corresponding simplification in implementation and a reduction of costs. In the case of a load operation of the DC voltage apparatuses 5 and 6, the DC voltage apparatuses must then naturally be operable at half the operating voltage, i.e. at an operating voltage which is half the operating voltage in normal operation.

Figure 3:
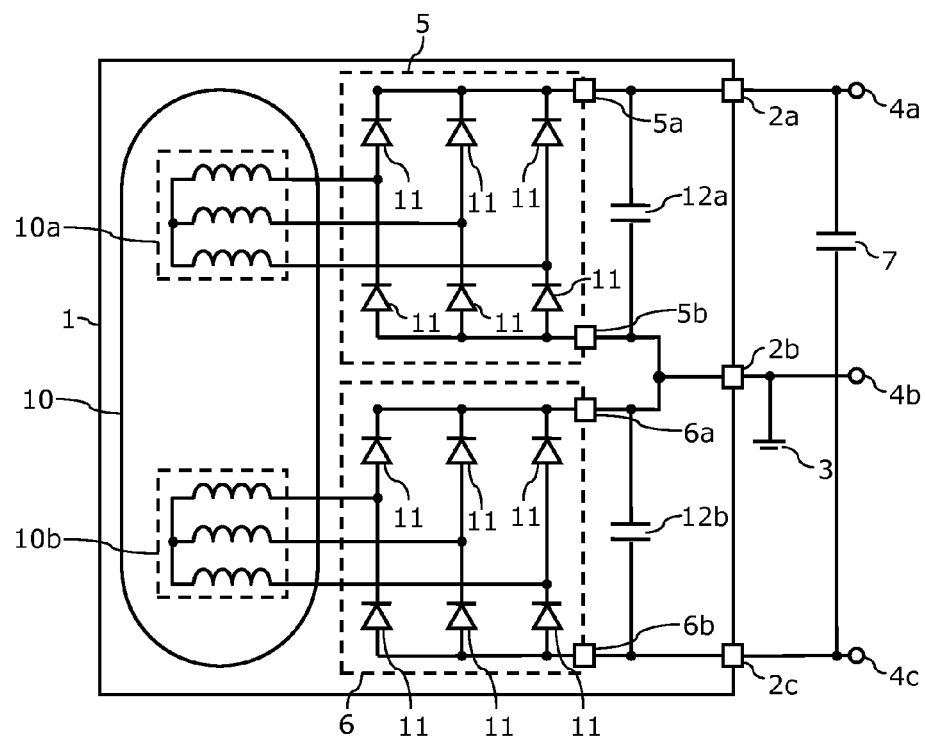
FIG. 3 shows a schematic illustration of a high-voltage DC voltage unit with two uncontrolled rectifiers according to a further embodiment of the invention.
Figure 4:
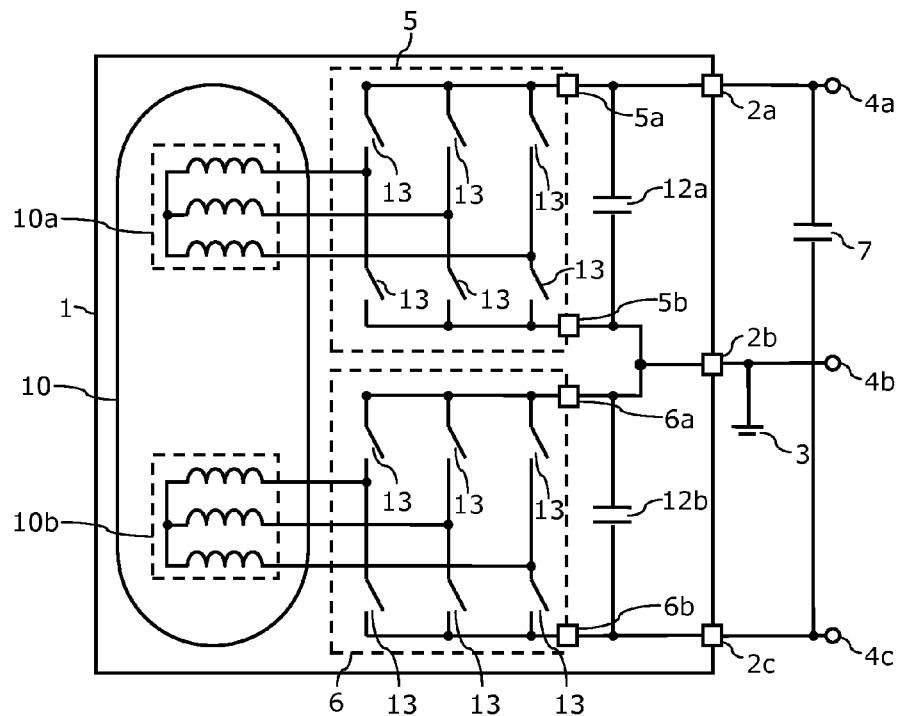
FIG. 4 shows a schematic illustration of a high-voltage DC voltage unit with two four-quadrant actuators according to a further embodiment of the invention.

FIGS. 3 and 4 show exemplary variants of embodiments of high-voltage DC voltage units 1 of this type, as illustrated schematically in FIG. 2. In FIG. 3, the DC voltage apparatuses 5 and 6 are configured as uncontrolled rectifiers with rectifier diodes 11. In FIG. 4, the DC voltage apparatuses 5 and 6 each comprise four-quadrant actuators with switching elements 13. In this respect, the switching elements 13 can comprise, for example, power semiconductor switches, such as MOSFET switches, IGBT switches, bipolar transistors, thyristors or triacs. Depending on requirements, a respective inverse diode can also be connected in the opposite direction and parallel to the switching elements 13 of the four-quadrant actuator. The embodiment with the four-quadrant actuators in FIG. 4 has the advantage that a bidirectional operation is possible, for example to start the alternating voltage generators 10a and 10b in the electrical machine 10 or to generally operate the electrical machine 10.

In both FIG. 3 and FIG. 4, the DC voltage apparatuses 5 and 6 are each depicted as three-phase power converters which are supplied in each case with a three-phase alternating voltage by alternating voltage generators 10a and 10b. The alternating voltage generators 10a and 10b are coupled in a phase-related manner with respectively one of the DC voltage apparatuses 5 and 6. Of course, the number of three phases in the variants of FIGS. 3 and 4 is merely an example and any other number of phases is also possible.

The two alternating voltage generators 10a and 10b can advantageously be configured within a single electrical machine 10 with two sets of windings which are respectively connected together at the neutral point. In this respect, machines 10 in a delta connection are also possible. However, it is naturally also possible to operate two separate electrical machines 10, in each case in alternating voltage generator mode to supply the DC voltage apparatuses 5 and 6 with electric alternating voltage. Furthermore, it is also possible to individually control each of the phases of the DC voltage apparatuses 5 and 6, for example by full bridges.

A first DC voltage intermediate circuit 7 is respectively coupled between the DC voltage output connections 2a and 2c in the high-voltage DC voltage units 1 in FIGS. 3 and 4. The output connections 5a and 5b as well as 6a and 6b are coupled in each case with intermediate circuit capacitors 12a and 12b via second DC voltage intermediate circuits.

Figure 5:
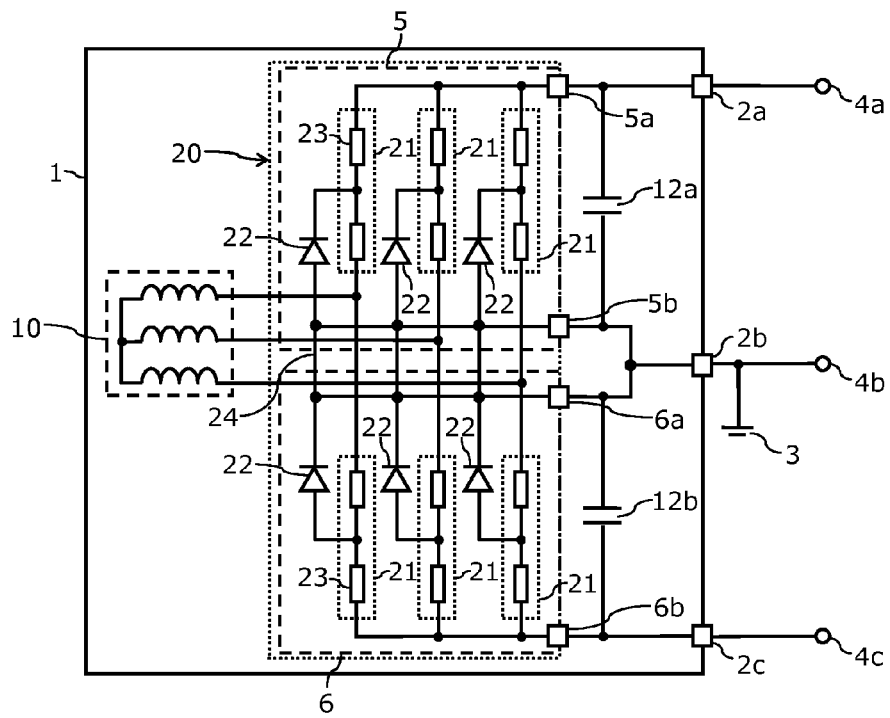
FIG. 5 shows a schematic illustration of a high-voltage DC voltage unit with a three-level (A)NPC power converter according to a further embodiment of the invention.

FIG. 5 shows a schematic illustration of a high-voltage DC voltage unit 1 with a three-level NPC power converter ("3-level neutral point clamped voltage source converter", 3-L NPC VSC) 20 as an alternative embodiment to the embodiments in FIGS. 3 and 4. Of course, it is possible for more or less than three phases to be implemented with the NPC power converter, so that the high-voltage DC voltage unit 1 can also be generally realised with a multi-level NPC power converter.

The three-level NPC power converter 20 has respectively two bridge halves which respectively correspond to the DC voltage apparatuses 5 and 6. The bridge halves comprise in each case three phase half bridges 21 with respectively two series-connected power semiconductor switches 23, the first series input connections of which are fed in each case from a phase of an electrical machine 10. The power semiconductor switches 23 can comprise, for example, MOSFET switches, IGBT switches, BJT switches, JFET switches, bipolar transistors, thyristors, triacs or similar switching elements, to which a free-wheeling diode or inverse diode (not shown) can be connected in each case in an opposite and parallel direction. Depending on the nature or type of the power semiconductor switch 23, the parallel connected free-wheeling diode can also be integrated into the semiconductor substrate of the power semiconductor switch 23, for example.

The second series input connections of the phase half bridges 21 are respectively coupled with the output connections 5a and 6b of the DC voltage apparatuses 5 and 6. The centre taps between two power semiconductor switches 23 of one phase half bridge 21 are respectively connected by centre tap diodes 22 ("neutral point clamped diodes", NPC diodes) to a phase-crossing centre tap bar 24 which are coupled with the output connections 5b and 6a of the two DC voltage apparatuses 5 and 6. In this respect, it can also be possible to replace the centre tap diodes 22 with active switching elements, such as power semiconductor switches or to connect active switching elements parallel to the centre tap diodes 22, so that it is possible to realise an ANPC power converter ("active neutral point clamped"). By apparatus of an appropriate switching strategy of the active switching elements, such as IGBT or MOSFET power semiconductor switches, the output voltage can thereby be clamped in an active manner with respect to the reference potential of the rectifier circuit.

Analogously to the high-voltage DC voltage unit 1 in FIG. 3 or 4, the two output connections 5a and 5b, and 6a and 6b of the DC voltage apparatus 5 and 6 in FIG. 5 are respectively coupled via DC voltage intermediate circuits with intermediate circuit capacitors 12a and 12b to stabilise the voltage. In this respect, it is possible to tap a first high-voltage DC voltage, for example +270 V between the first DC voltage connection 2a and the reference potential connection 2b which is coupled with an earth potential 3 and the two output connections 5b and 6a and to tap a second high-voltage DC voltage of a different polarity, for example −270 V between the second DC voltage connection 2c and the reference potential connection 2b. As a result, the high-voltage DC voltage unit 10 in FIG. 5 can provide a bipolar high-voltage DC voltage or it can remove power from connected DC voltage sources via a bipolar high-voltage DC voltage.

The use of a multi-level (A)NPC power converter 20 in a high-voltage DC voltage unit 1 has the advantage that when one of the DC voltage connections 2a or 2c fails, a limited operating mode is possible which only entails the loss of one switching point. For example, if the DC voltage connection 2a fails, for example due to a high impedance on the DC voltage connection 2a, or if there is a short circuit between the DC voltage connection 2a and the reference potential connection 2b, the circuit can continue to be operated in two-level operating mode in that the source-side power semiconductor switches 23 of the phase half bridges 21 or a load-side power semiconductor switch 23 of the phase half bridges 21 of the DC voltage apparatus 6 are permanently closed. As a result, the electrical machine 10 which feeds the DC voltage apparatuses 5 and 6 is operated at half the nominal voltage, i.e. the motor is operated at approximately half power. Alternatively, the electrical machine 10 can be operated at lower operating speeds in a field weakening area.

In particular, with this arrangement it is possible to cut back on additional safeguarding measures in the backend of the high-voltage DC voltage unit 1, such as clamping diodes, conditionally switchable safeguard elements or additional power factor correction stages, without having to dispense with a desirable failure redundancy.

Furthermore, there is the advantage that due to the independent operability of the two DC voltage apparatuses 5 and 6, i.e. of the two phase halves of the multi-level NPC power converter 20, no common-mode voltage fluctuations, or at least greatly reduced common-mode voltage fluctuations occur between the DC voltage connections 2a and 2c, and the reference potential connection 2b. Consequently, it is possible to set respectively different voltage levels in the two bipolar DC voltage supplies for different DC voltage loads.

Furthermore, a DC voltage intermediate circuit can also be coupled between the DC voltage connections 2a or 2c, analogously to the DC voltage intermediate circuit 7 in FIG. 4.

Figure 6:
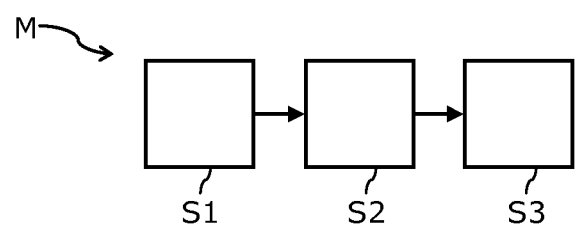
FIG. 6 shows a schematic illustration of a method for operating a high-voltage DC voltage unit according to a further embodiment of the invention.

FIG. 6 shows a schematic illustration of a method M for operating a high-voltage DC voltage unit, in particular the high-voltage DC voltage unit 1 shown in FIG. 5. The method M can be used, for example, if one of the bipolar DC voltage connections 2a or 2c of the high-voltage DC voltage unit 1 fails, for example if there is an excessively high impedance of one of the DC voltage connections 2a or 2c, or if there is a short circuit between one of the DC voltage connections 2a and 2c and the reference potential connection 2b.

The method M comprises as the first step S1 the generation of a first high-voltage DC voltage by a first DC voltage apparatus 5 between a first output connection 5a and a second output connection 5b of the first DC voltage apparatus 5. In a second step S2, a second high-voltage DC voltage is generated by a second DC voltage apparatus 6 between a first output connection 6a and a second output connection 6b of the second DC voltage apparatus 6.

As a result, in step S3, a bipolar power supply can be implemented with two high-voltage DC voltages of different polarities and amplitudes, in that the first high-voltage DC voltage is provided between a first DC voltage connection 2a which is coupled with the first output connection 5a of the first DC voltage apparatus 5, and a reference potential connection 2b which is coupled with the second output connection 5b of the first DC voltage apparatus 5, the first output connection 6a of the second DC voltage apparatus 6 and an earth potential 3, and the second high-voltage DC voltage is provided between a second DC voltage connection 2c which is coupled with the second output connection 6b of the second DC voltage apparatus 6, and the reference potential connection 2b.

Figure 7:
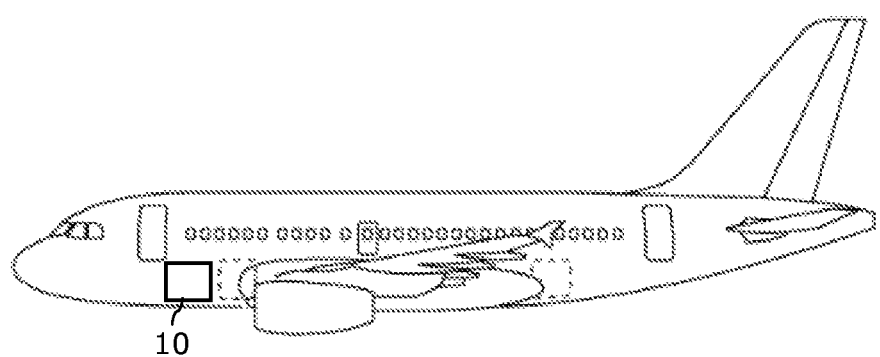
FIG. 7 shows a schematic illustration of an aircraft having a high-voltage DC voltage unit according to a further embodiment of the invention.

FIG. 7 shows a schematic illustration of an aircraft with a high-voltage DC voltage unit, for example a high-voltage DC voltage unit 1 according to any one of FIGS. 2 to 5. The high-voltage DC voltage unit 1 can be used to realise in the aircraft a bipolar power supply with DC voltage, for example ±270 V, for DC voltage loads in the aircraft.

What is claimed is:

1. An aircraft having a high-voltage DC voltage unit, the high-voltage DC voltage unit, comprising:
   a first DC voltage apparatus which is configured to provide a first high-voltage DC voltage between a first output connection and a second output connection of the first DC voltage apparatus or is configured to be fed with a first high-voltage DC voltage;
   a second DC voltage apparatus which is configured to independently provide a second high-voltage DC voltage between a first output connection and a second output connection of the second DC voltage apparatus or is configured to be fed with an independent second high-voltage DC voltage;
   a first DC voltage connection which is coupled with the first output connection of the first DC voltage apparatus;
   a second DC voltage connection which is coupled with the second output connection of the second DC voltage apparatus; and
   a reference potential connection which is coupled with the second output connection of the first DC voltage apparatus, with the first output connection of the second DC voltage apparatus and with an earth potential, wherein the first and second high-voltage DC voltages realise a bipolar power supply.

2. The high-voltage DC voltage unit according to claim 1, wherein the DC voltage apparatuses each have uncontrolled rectifiers.

3. The high-voltage DC voltage unit according to claim 1, wherein the DC voltage apparatuses each have four-quadrant actuators.

4. The high-voltage DC voltage unit according to claim 2, further comprising:
   two alternating voltage generators which are coupled respectively with one of the DC voltage apparatus and are configured to feed the respectively coupled DC voltage apparatus with electric alternating voltage.

5. The high-voltage DC voltage unit according to claim 4, wherein the two alternating voltage generators are configured within a single electrical machine with two sets of windings.

6. The aircraft according to claim 1, wherein the DC voltage apparatuses are bridge halves of a multi-level NPC power converter.

7. The aircraft according to claim 6, further comprising:
   an electrical machine which is coupled with the multi-level NPC power converter and is configured to feed both bridge halves of said multi-level NPC power converter with electric alternating voltage.

8. The high-voltage DC voltage unit according to claim 1, further comprising:
   a first DC voltage intermediate circuit which is coupled between the DC voltage output connections.

9. The aircraft according to claim 1, further comprising:
   two second DC voltage intermediate circuits which are respectively coupled between the first and second output connections of the first and second DC voltage apparatuses.

10. A method for operating a high-voltage DC voltage unit of an aircraft according to claim 1, comprising:

generating a first high-voltage DC voltage by a first DC voltage apparatus between a first output connection and a second output connection of the first DC voltage apparatus;

independently generating a second high-voltage DC voltage by a second DC voltage apparatus between a first output connection and a second output connection of the second DC voltage apparatus;

providing a bipolar power supply by providing the first high-voltage DC voltage between a first DC voltage connection which is coupled with the first output connection of the first DC voltage apparatus, and a reference potential connection which is coupled with the second output connection of the first DC voltage apparatus, with the first output connection of the second DC voltage apparatus and with an earth potential, and by providing the second high-voltage DC voltage between a second DC voltage connection which is coupled with the second output connection of the second DC voltage apparatus, and the reference potential connection.

* * * * *